(12) United States Patent
Baek et al.

(10) Patent No.: US 11,796,024 B2
(45) Date of Patent: Oct. 24, 2023

(54) SHOCK ABSORBER

(71) Applicant: HL MANDO CORPORATION, Pyeongtaek-si (KR)

(72) Inventors: Kwangduk Baek, Yongin-si (KR); Seungjoon Lee, Seoul (KR)

(73) Assignee: HL Mando Corporation, Pyeongtaek-si (KR)

( * ) Notice: Subject to any disclaimer, the term of this patent is extended or adjusted under 35 U.S.C. 154(b) by 0 days.

(21) Appl. No.: 17/744,953

(22) Filed: May 16, 2022

(65) Prior Publication Data

US 2022/0373057 A1    Nov. 24, 2022

(30) Foreign Application Priority Data

May 18, 2021   (KR) .................. 10-2021-0064287

(51) Int. Cl.
  *F16F 9/49*     (2006.01)
  *F16F 9/16*     (2006.01)

(52) U.S. Cl.
  CPC ..................... *F16F 9/16* (2013.01)

(58) Field of Classification Search
  CPC ........................ F16F 9/16; F16F 9/49
  See application file for complete search history.

(56) References Cited

U.S. PATENT DOCUMENTS

| | | | | |
|---|---|---|---|---|
| 4,416,445 A * | 11/1983 | Coad | ............. | F16F 9/08 |
| | | | | 137/854 |
| 9,091,320 B1 * | 7/2015 | Smith | ............. | F16F 9/48 |
| 10,962,081 B2 * | 3/2021 | Sankaran | ............. | B60G 13/08 |
| 11,649,873 B1 * | 5/2023 | Smith | ............. | F16F 9/22 |
| | | | | 188/314 |
| 2006/0027954 A1 * | 2/2006 | Nesbitt | ............. | F16F 9/49 |
| | | | | 267/64.11 |
| 2016/0223045 A1 * | 8/2016 | Baldoni | ............. | B60G 15/062 |
| 2018/0355944 A1 * | 12/2018 | Veltum | ............. | F16F 9/185 |
| 2020/0011395 A1 * | 1/2020 | Sankaran | ............. | F16F 9/49 |
| 2021/0115998 A1 * | 4/2021 | Meinert | ............. | F16F 9/48 |
| 2022/0381314 A1 * | 12/2022 | Lee | ............. | F16F 9/366 |

* cited by examiner

*Primary Examiner* — Thomas W Irvin
(74) *Attorney, Agent, or Firm* — Morgan, Lewis & Bockius LLP (57) ABSTRACT

Disclosed is a shock absorber. The shock absorber includes a cylinder filled with a fluid, and a piston valve coupled to an end of a piston rod to partition the inside of the cylinder into a rebound chamber and a compression chamber and to which a lower washer is fastened at a lower end thereof, and further includes a guide member disposed to be spaced apart from the lower side of the piston valve so as to be movable forward and backward within the cylinder and having a connection flow path communicating a pressing chamber formed at a lower side and the compression chamber, a bumper member provided to be compressible in the pressing chamber to elastically support the guide member, and a support member coupled to an end of the cylinder to support a lower end of the bumper member and having a communication hole communicating with the pressing chamber, wherein the bumper member partitions the pressing chamber into a first pressing chamber and a second pressing chamber and has a plurality of side holes communicating the first pressing chamber and the second pressing chamber.

19 Claims, 8 Drawing Sheets

SHOCK ABSORBER

CROSS-REFERENCE TO RELATED APPLICATION(S)

This application is based on and claims priority under 35 U.S.C. § 119 to Korean Patent Application No. 10-2021-0064287, filed on May 18, 2021, in the Korean Intellectual Property Office, the disclosure of which is incorporated by reference herein in its entirety.

BACKGROUND

1. Field

The disclosure relates to a shock absorber, and more particularly, to a shock absorber capable of implementing an additional damping force to an amount of shock transmitted from a road surface during a compression stroke and buffering a shock during the compression stroke at an extremely low speed, thereby improving ride comfort and steering stability.

2. Description of the Related Art

In general, a shock absorbing device is installed in a vehicle to improve ride comfort by buffering a shock or vibration that an axle receives from a road surface during driving, and a shock absorber is used as one of such shock absorbers.

The shock absorber operates in response to a vibration of a vehicle depending on a road surface condition, and in this case, a damping force generated by the shock absorber varies depending on an operating speed of the shock absorber, that is, depending on whether the operating speed is fast or slow.

Because ride comfort and driving stability of a vehicle may be controlled depending on how the characteristics of the damping force generated by the shock absorber are adjusted, it is very important to control the damping force characteristics of the shock absorber when designing the vehicle.

Such a shock absorber typically includes a cylinder filled with a working fluid (oil), a piston rod connected to a vehicle body side to reciprocate, and a piston valve coupled to a lower end of the piston rod to slide within the cylinder and control a flow of the working fluid.

The piston valve is designed to have a constant damping characteristic at a high speed, medium speed and low speed using a single flow path. However, such a piston valve has a structure in which it is difficult to apply a damping force when the compression stroke is performed at an extremely low speed.

In addition, there is a need to secure the cylinder by a certain length or more for a case where the piston rod performs the compression stroke over a certain stroke, and this has a disadvantage in that a length and volume of the shock absorber are excessively increased.

Korean Patent Publication No. 10-2018-0083725 has been disclosed as an example of a conventional shock absorber.

SUMMARY

It is an aspect of the disclosure to provide a shock absorber capable of preventing from excessively increasing a length and volume thereof by applying an additional damping force during a compression stroke over a certain stroke.

It is an aspect of the disclosure to provide a shock absorber capable of improving ride comfort and adjustment stability of a vehicle by applying a step-by-step damping force during a compression stroke over a certain stroke.

Additional aspects of the disclosure will be set forth in part in the description which follows and, in part, will be obvious from the description, or may be learned by practice of the disclosure.

In accordance with an aspect of the disclosure, a shock absorber includes a cylinder filled with a fluid, and a piston valve coupled to an end of a piston rod to partition the inside of the cylinder into a rebound chamber and a compression chamber and to which a lower washer is fastened at a lower end thereof, and further includes a guide member disposed to be spaced apart from the lower side of the piston valve so as to be movable forward and backward within the cylinder and having a connection flow path communicating a pressing chamber formed at a lower side and the compression chamber, a bumper member provided to be compressible in the pressing chamber to elastically support the guide member, and a support member coupled to an end of the cylinder to support a lower end of the bumper member and having a communication hole communicating with the pressing chamber, wherein the bumper member partitions the pressing chamber into a first pressing chamber and a second pressing chamber and has a plurality of side holes communicating the first pressing chamber and the second pressing chamber.

The connection flow path may include a first connection flow path communicating the compression chamber and the first pressing chamber, and second connection flow paths communicating the compression chamber and the second pressing chamber.

The guide member may include a plurality of upper protrusions formed to protrude from an upper surface thereof and arranged to be spaced apart from each other.

The guide member may include a plurality of lower grooves formed to be recessed on a lower surface thereof and arranged to be spaced apart from each other.

The second connection flow paths may have inlets formed at the plurality of upper protrusions and outlets formed at the plurality of lower grooves.

The plurality of upper protrusions may be arranged at regular intervals.

The second connection flow paths may be opened and closed by ascending and descending of the lower washer.

The bumper member may have one end coupled to the guide member, and the other end coupled to the support member.

The bumper member may include a bellows portion provided to generate an elastic force due to a restoring force against contraction or expansion, and protrusions protruding from an outer surface of the bellows portion to restrict movement of the bumper member in a width direction.

A sealing member provided to seal a gap between an outer circumferential surface of the guide member and an inner circumferential surface of the cylinder may be mounted on the outer circumferential surface of the guide member.

The shock absorber may further include an outer tube disposed to be spaced apart from the outside of the cylinder to form a reservoir chamber between the cylinder and the outer tube.

The shock absorber may further include a body valve coupled to a lower end of the support member to communicate the connection flow path with the reservoir chamber and generate a damping force.

In accordance with another aspect of the disclosure, a shock absorber includes a cylinder filled with a fluid, a piston rod provided to be movable vertically in the cylinder and to which a piston valve is coupled at one side thereof, the piston valve being provided to partition the inside of the cylinder into a rebound chamber and a compressed chamber and to which a lower washer is fastened at a lower end thereof, and a valve assembly coupled to an end of the cylinder to vary a damping force depending on a stroke length of the piston rod, wherein the valve assembly includes a guide member provided to be movable forward and backward in the cylinder and having a first connection flow path formed to vertically penetrate a central portion thereof and second connection flow paths formed to vertically penetrate the guide member at a peripheral portion of the first connection flow path, a bumper member provided in a cylindrical shape to elastically support a lower surface of the guide member and having a plurality of side holes formed on a side surface thereof, and a support member coupled to an end of the cylinder to support a lower end of the bumper member and having a communication hole formed to vertically penetrate the support member.

The guide member may include a plurality of upper protrusions formed to protrude from the upper surface thereof and arranged to be spaced apart from each other, and slit flow paths formed between the plurality of upper protrusions.

The second connection flow paths may be formed on the upper protrusions to be opened and closed by the lower washer.

The bumper member may include a bellows portion provided to generate an elastic force due to a restoring force against contraction or expansion, and protrusions protruding from an outer surface of the bellows portion to restrict movement of the bumper member in a width direction.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, an embodiment of the disclosure will be described in detail with reference to the accompanying drawings. The following embodiment is provided to fully convey the spirit of the disclosure to a person having ordinary skill in the art to which the disclosure belongs. The disclosure is not limited to the embodiment shown herein but may be embodied in other forms. The drawings are not intended to limit the scope of the disclosure in any way, and the size of components may be exaggerated for clarity of illustration.

Figure 1:
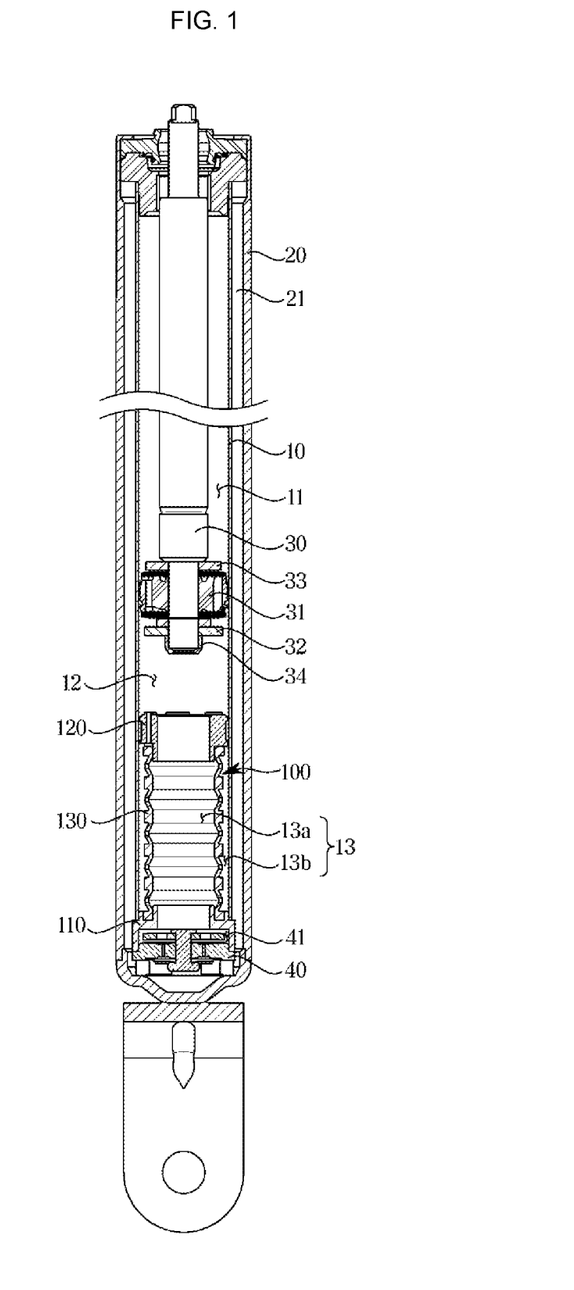
FIG. 1 is a cross-sectional view of a shock absorber according to an embodiment of the disclosure.
Figure 2:
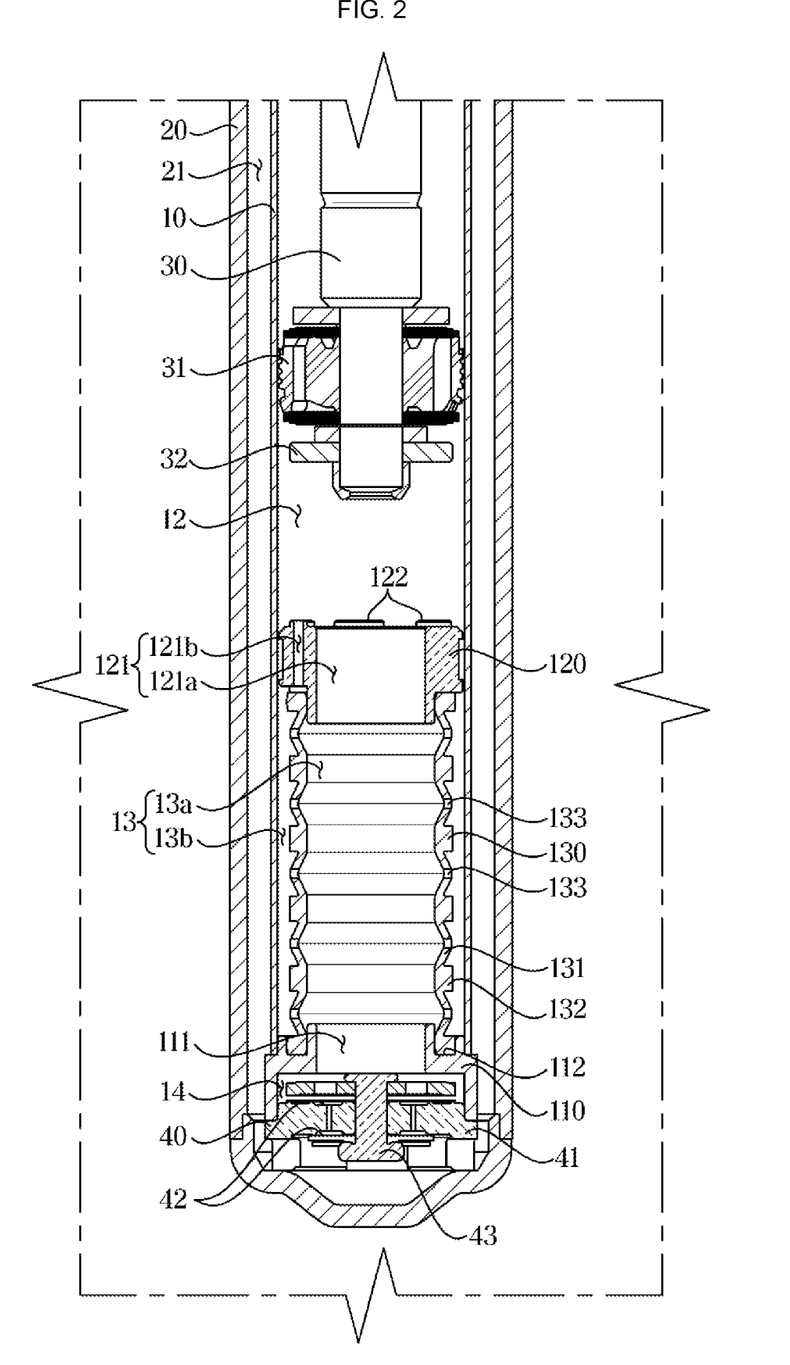
FIG. 2 is an enlarged cross-sectional view of the shock absorber according to an embodiment of the disclosure.
Figure 3:
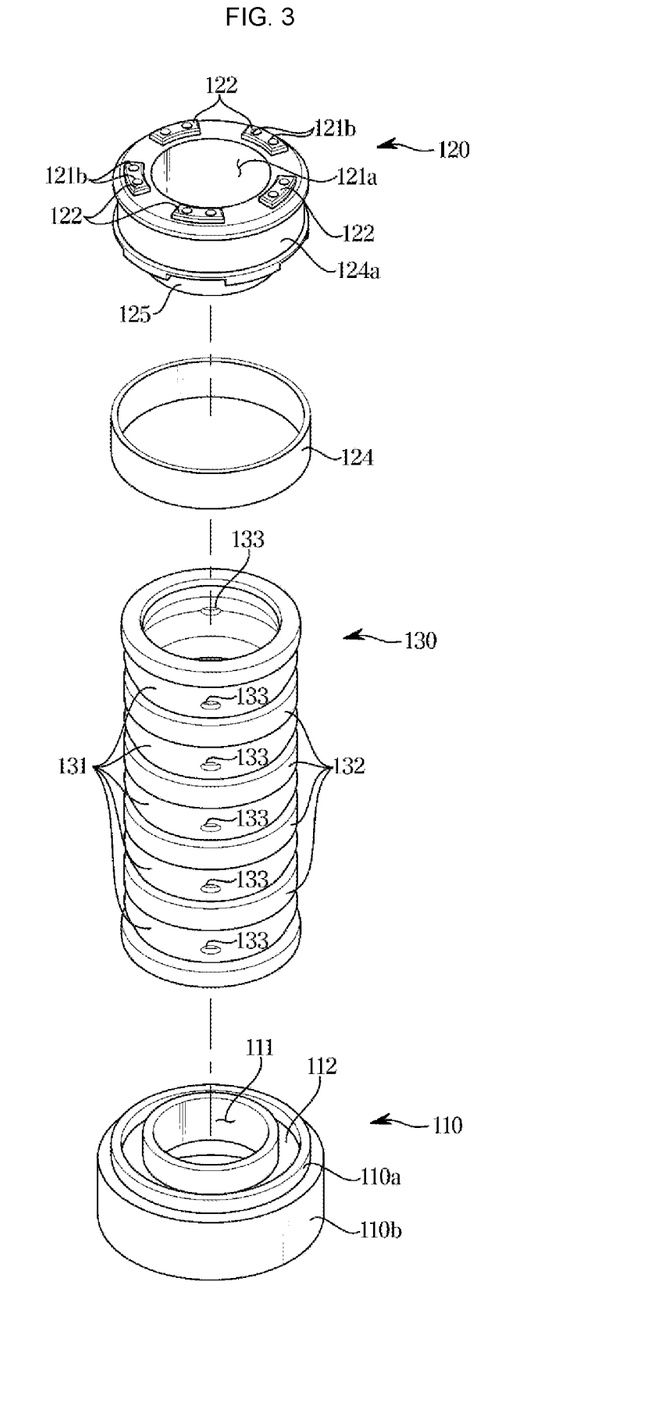
FIG. 3 is an exploded perspective view of a valve assembly of the shock absorber according to an embodiment of the disclosure.
Figure 4:
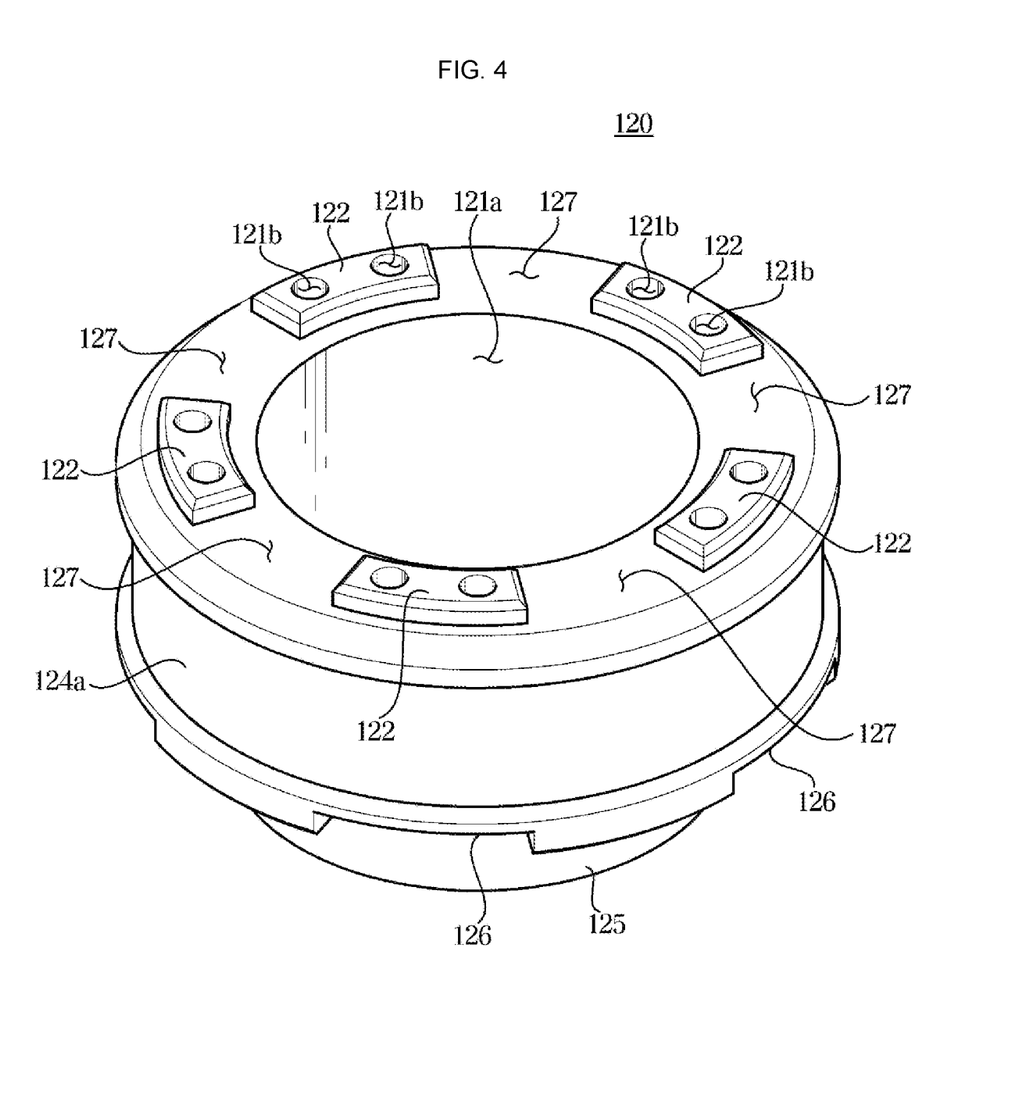
FIG. 4 is a perspective view illustrating an upper surface of a guide member of the shock absorber according to an embodiment of the disclosure.
Figure 5:
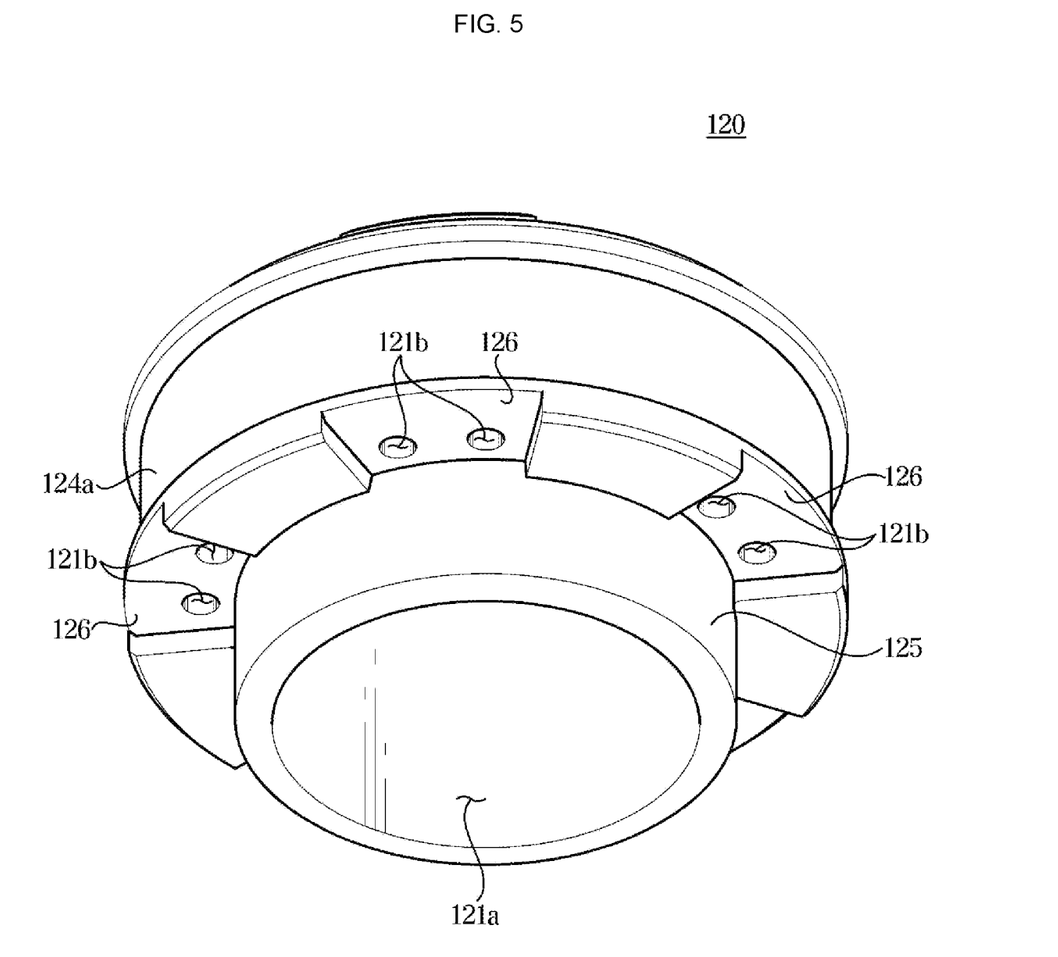
FIG. 5 is a perspective view illustrating a lower surface of the guide member of the shock absorber according to an embodiment of the disclosure.

FIG. 1 is a cross-sectional view of a shock absorber according to an embodiment of the disclosure, FIG. 2 is an enlarged cross-sectional view of the shock absorber according to an embodiment of the disclosure, FIG. 3 is an exploded perspective view of a valve assembly of the shock absorber according to an embodiment of the disclosure, FIG. 4 is a perspective view illustrating an upper surface of a guide member of the shock absorber according to an embodiment of the disclosure, and FIG. 5 is a perspective view illustrating a lower surface of the guide member of the shock absorber according to an embodiment of the disclosure.

Referring to FIGS. 1 to 5, a shock absorber 1 according to an embodiment of the disclosure may include a piston rod 30 provided to reciprocate inside a cylinder 10 in which a fluid is filled, a piston valve 31 mounted on the piston rod 30 to partition the inside of the cylinder 10 into a rebound chamber 11 and a compression chamber 12 and to which a lower washer 32 is fastened at a lower end thereof, and a valve assembly 100 coupled to an end of the cylinder 10 to vary a damping force depending on a stroke length of the piston rod 30. The shock absorber 1 according to an embodiment of the disclosure may further include an outer tube 20 provided on the outside of the cylinder 10 and having a reservoir chamber 21 formed therein, and a body valve 40 coupled to a lower end of the valve assembly 100 to communicate the reservoir chamber 21 and the valve assembly 100 and generate a damping force.

The cylinder 10 may be provided in a cylindrical shape forming a space therein, and the inside of the cylinder 10 is filled with the working fluid (oil). The inside of the cylinder 10 may be partitioned into the compression chamber 12 formed on a lower side and the rebound chamber 11 formed on an upper side by the piston valve 31.

The piston rod 30 has one end positioned inside the cylinder 10 and the other end extending to the outside of the cylinder 10 to be connected to a vehicle body (not shown) or a wheel side. In this case, the piston valve 31 is mounted on one end of the piston rod 30.

The piston valve 31 is provided to reciprocate inside the cylinder 10 filled with the fluid together with the piston rod 30 in a state of penetrating and being coupled to the piston rod 30. In this case, at least one compression flow path and rebound flow path are formed to vertically penetrate the piston valve 31 so that the fluid may move through the piston valve 31 during the compression stroke or the rebound stroke. The piston valve 31 as described above generates a damping force due to a resistance of the fluid while flowing the fluid into the compression chamber 12 or the rebound chamber 11 during the compression stroke or the rebound stroke within the cylinder 10.

An upper washer 33 and a lower washer 32 may be mounted on the upper side and a lower side of the piston valve 31, respectively, and fastened by a nut 34 to be fixed to the piston rod 30.

A hole of a ring shape through which the piston rod 30 penetrates may be provided in the center of the lower washer 32. In this case, an outer diameter of the lower washer 32 may be formed to extend in a radial direction so as to be in close contact with an upper protrusion 122 during the compression stroke.

The valve assembly 100 may be coupled to an end of the cylinder 10 to generate an additional damping force depending on the stroke length of the piston rod 30. Specifically, the valve assembly 100 may generate an additional damping force depending on the stroke length of the piston rod 30 during the compression stroke of the piston valve 31. A detailed description of the valve assembly 100 will be provided later.

The body valve 40 may be coupled to the lower end of the valve assembly 100 to generate an additional damping force. Specifically, the body valve 40 may include a body part 41 interposed between the valve assembly 100 and a valve case 50 and having one or more flow paths formed to penetrate vertically, a plurality of disks 42 provided at an upper end and a lower end of the body part 41, respectively, to generate a damping force by regulating a flow of the fluid passing through the flow paths, and a fastening member 43 provided to fasten the plurality of disks 42 to the body part 41.

The outer tube 20 may be provided in a cylindrical shape forming a space therein, and has an inner diameter larger than that of the cylinder 10 to accommodate the cylinder 10 therein. In this case, the reservoir chamber 21 filled with the working fluid (oil) is formed between the inner side of an outer tube 20 and an outer side of the cylinder 10. The reservoir chamber 21 is provided to communicate with the cylinder 10 through the body valve 40 and the valve assembly 100.

The valve assembly 100 according to an embodiment of the disclosure may include a guide member 120 disposed to be spaced apart from the lower side of the piston valve 31 so as to be movable forward and backward within the cylinder 10 and having a connection flow path 121 for communicating a pressing chamber 13 formed at a lower side and the compression chamber 12, a bumper member 130 provided to be compressible in the pressing chamber 13 to elastically support the guide member 120, and a support member 110 coupled to an end of the cylinder 10 to support a lower end of the bumper member 130 and having a communication hole 111 communicating with the pressing chamber 13.

The valve assembly 100 may additionally apply a damping force depending on the stroke length of the piston rod 30 during the compression stroke. A detailed description of an operation of the valve assembly 100 will be provided later.

The valve assembly 100 may be coupled to the cylinder 10 in a state of being assembled as one assembly by assembly of the support member 110, the guide member 120, and the bumper member 130.

The support member 110 may have one side coupled to an end of the cylinder 10 to support the lower end of the bumper member 130, and the other side provided such that the body valve 40 is coupled thereto.

Specifically, the support member 110 may include a small-diameter part 110a provided to be press-fitted to an end of the cylinder 10, and a large-diameter part 110b provided to have a larger radius than the small-diameter part 110a, having a hollow lower chamber 14 formed at a lower end thereof, and to which the body valve 40 is coupled.

The support member 110 may have the communication hole 111 formed to penetrate vertically in the center thereof so as to allow the fluid to flow. Accordingly, the communication hole 111 communicates the pressing chamber 13 and the lower chamber 14.

The support member 110 may be provided with a mounting groove 112 formed on an upper surface to receive and support the lower end of the bumper member 130. The mounting groove 112 may be formed by being recessed along a circumferential direction around the communication hole 110 of the support member 110 so that the lower end of the bumper member 130 is press-fitted thereto.

The guide member 120 is disposed to be spaced apart from the lower side of the piston valve 31 so as to be movable forward and backward within the cylinder 10.

The guide member 120 partitions the compression chamber 12 and the pressing chamber 13, and includes the connection flow path 121 for communicating the compression chamber 12 and the pressing chamber 13. A part of the connection flow path 121 is provided to be opened and closed by ascending and descending of the lower washer 32, and thus a high pressure may be formed in the pressing chamber 13.

The connection flow path 121 includes a first connection flow path 121a provided at a central portion of the guide member 120 to communicate the compression chamber 12 and the pressing chamber 13, and a second connection flow path 121b provided at a radially outer side of the guide member 120 to be opened and closed by the lower washer 32. Accordingly, the valve assembly 100 according to the disclosure may vary a damping force of the shock absorber 1 depending on whether the first connection flow path 121a and the second connection flow path 121b are opened or closed, that is, depending on an active cross-sectional area (or effective cross-sectional area) of the first connection flow path 121a and the second connection flow path 121b.

The first connection flow path 121a is formed in a hole shape to vertically penetrate the central portion of the guide member 120 so as to communicate the compression chamber 12 and an inner space of the bumper member 130 (a first pressing chamber 13a).

The second connection flow path 121b is formed in a hole shape to vertically penetrate the radially outer side of the guide member 120 so as to communicate the compression chamber 12 and an outer space of the bumper member 130 (a second pressing chamber 13b). A plurality of the second connection flow paths 121b may be arranged to be spaced apart from each other at regular intervals along a circumferential direction of the guide member 120, and may have inlets formed on the upper protrusions 122 and outlets formed on lower grooves 126.

The guide member 120 may include the plurality of upper protrusions 122 formed to protrude from the upper surface thereof and arranged to be spaced apart from each other, and slit flow paths 127 formed as spaces between the plurality of upper protrusions 122. Preferably, the plurality of upper protrusions 122 may be radially provided to be arranged at regular intervals. Thus, because the guide member 120 communicates the compression chamber 12 and the pressing chamber 13 through the slit flow paths 127, formation of a negative pressure may be prevented.

The plurality of upper protrusions 122 is provided to be in close contact with a lower surface of the lower washer 32 during the compression stroke. The inlet of each of the second connection flow paths 121b may be provided on each of the upper protrusions 122.

Therefore, during the compression stroke, the lower washer 32 is in close contact with the upper protrusions 122 so that the second connection flow paths 121b may be closed, and at the same time, the first connection flow path 121*a* may communicate the compression chamber 12 and the pressing chamber 13 through the slit flow paths 127.

A mounting part 125 protruding to be coupled to one end of the bumper member 130 may be provided at the lower end of the guide member 120. An outer diameter of the mounting part 125 has a size corresponding to an inner diameter of the upper end of the bumper member 130 so that the mounting part 125 may be press-fitted to the inside of the bumper member 130, and the first connection flow path 121*a* may be formed to penetrate the center of the mounting part 125.

The guide member 120 may have the plurality of lower grooves 126 formed to be recessed on a lower surface thereof and arranged to be spaced apart from each other. Preferably, the plurality of lower grooves 126 may be radially provided to be arranged at regular intervals. Each of the lower grooves 126 may be provided with the outlet of each of the second connection flow paths 121*b*.

Therefore, even when the bumper member 130 is mounted on the lower end of the guide member 120, the second connection flow paths 121*b* may be provided to communicate with the second pressing chamber 13*b* through the lower grooves 126.

The guide member 120 may be provided with a coupling groove 124*a* formed to be recessed in a ring shape on an outer circumferential surface thereof, and a sealing member 124 provided to seal a gap between an inner circumferential surface of the cylinder 10 and the outer circumferential surface of the guide member 120 may be inserted into the coupling groove 124*a*.

The bumper member 130 is disposed in the pressing chamber 13 to elastically support the guide member 120.

The bumper member 130 has one end inserted into the mounting part 125 of the guide member 120 and the other end inserted into the mounting groove 112 of the support member 110 to elastically support the guide member 120 upward with respect to the support member 110.

The bumper member 130 may be made of a plastic material having rubber properties to have elasticity, and may be made of, for example, a TPE (thermo plastic elastomer) material.

Accordingly, the shock absorber 1 according to an embodiment of the disclosure may adjust the damping force by changing an elastic modulus through a change of the material of the bumper member 130.

The bumper member 130 is provided in a compressible cylindrical shape to partition the pressing chamber 13 into the inner first pressing chamber 13*a* and the outer second pressing chamber 13*b*, and has a plurality of side holes 133 provided on a side surface thereof to communicate the first pressing chamber 13*a* and the second pressing chamber 13*b*.

The bumper member 130 may include a bellows portion 131 provided to generate an elastic force due to a restoring force against contraction or expansion, and protrusions 132 protruding from an outer surface of the bellows portion 131 to restrict movement of the bumper member 130 in a width direction. The side hole 133 may be formed at each of protruding portions that extend outwardly when the bellows portion 131 is contracted. The position, size, and number of the side holes 133 illustrated in the drawings are merely exemplary, and various modifications are possible.

Accordingly, when a high pressure is formed in the second pressing chamber 13*b* during the compression stroke, the bumper member 130 may generate an additional damping force by flowing the working fluid accommodated in the second pressing chamber 13*b* to the first pressing chamber 13*a* through the plurality of side holes 133.

Therefore, the shock absorber 1 according to an embodiment of the disclosure may adjust the damping force by changing the size, shape, and number of the side holes 133 of the bumper member 130.

Hereinafter, an operation during the compression stroke of the shock absorber 1 according to an embodiment of the disclosure will be described.

Figure 6:
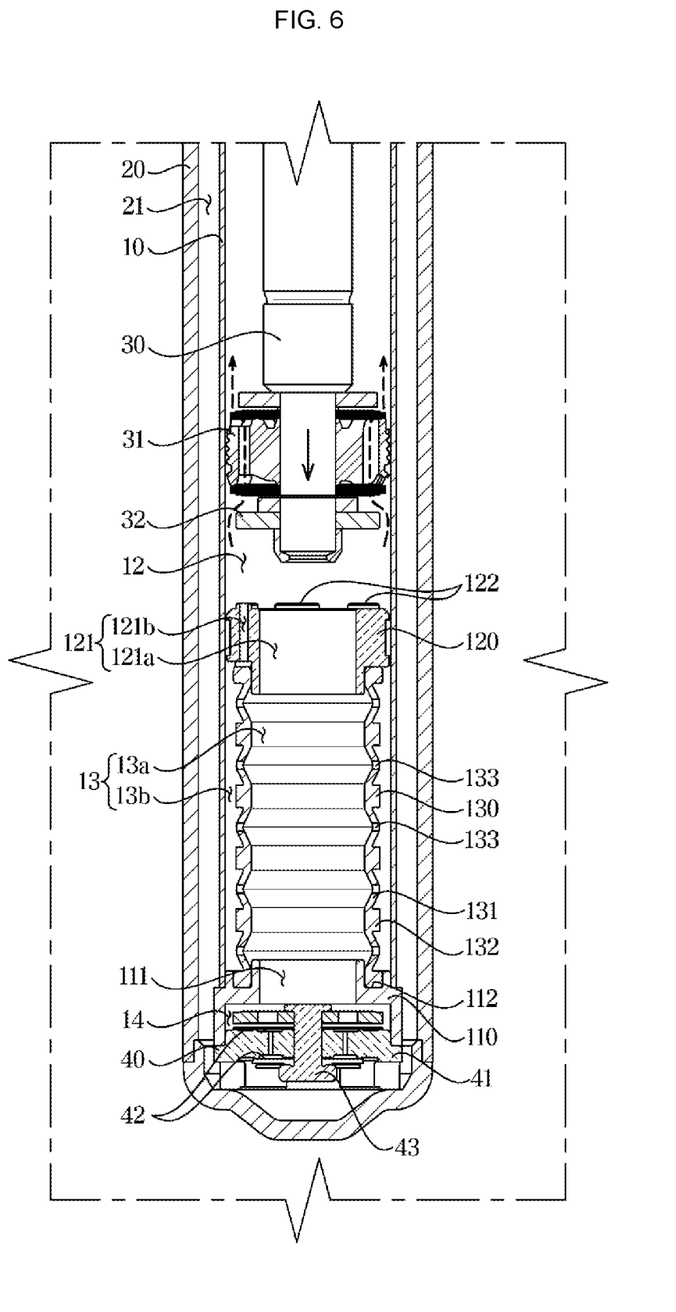
FIG. 6 illustrates an operation of the shock absorber during a compression stroke according to an embodiment of the disclosure.
Figure 7:
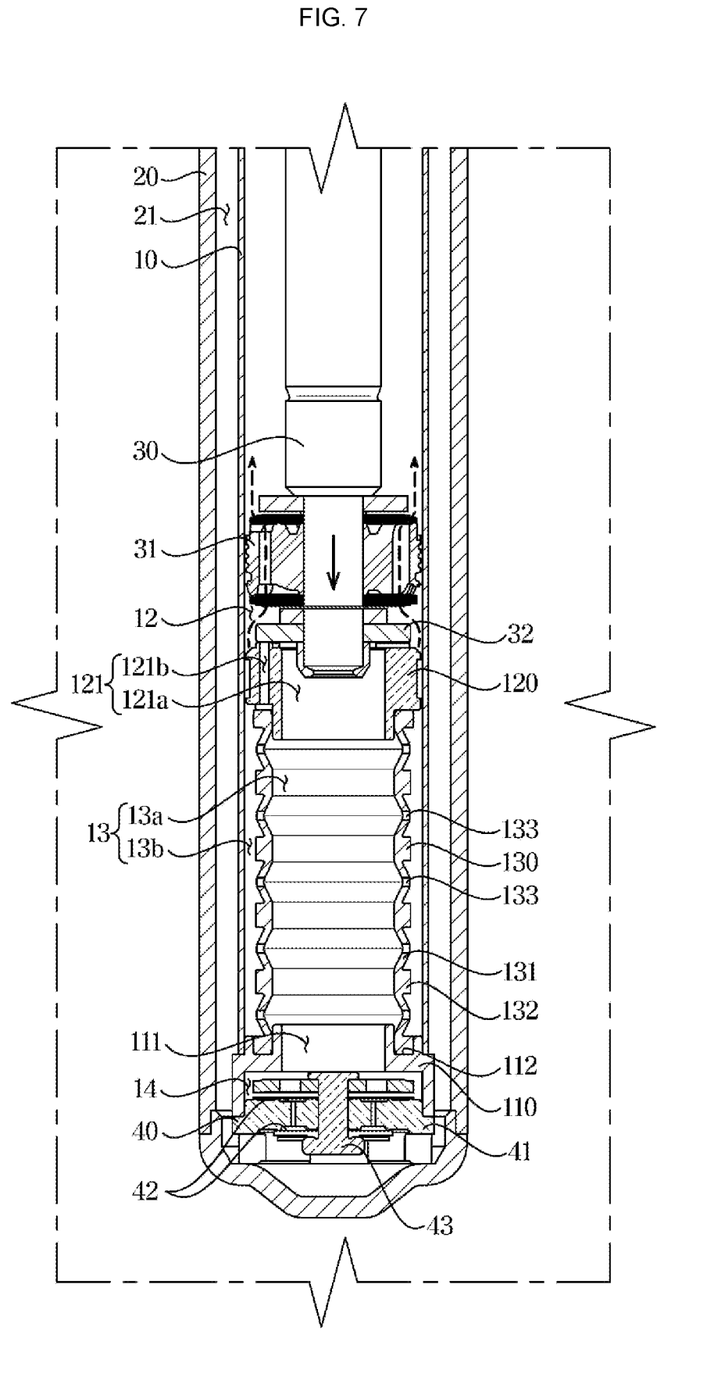
FIG. 7 illustrates an operation of the shock absorber during the compression stroke according to an embodiment of the disclosure.
Figure 8:
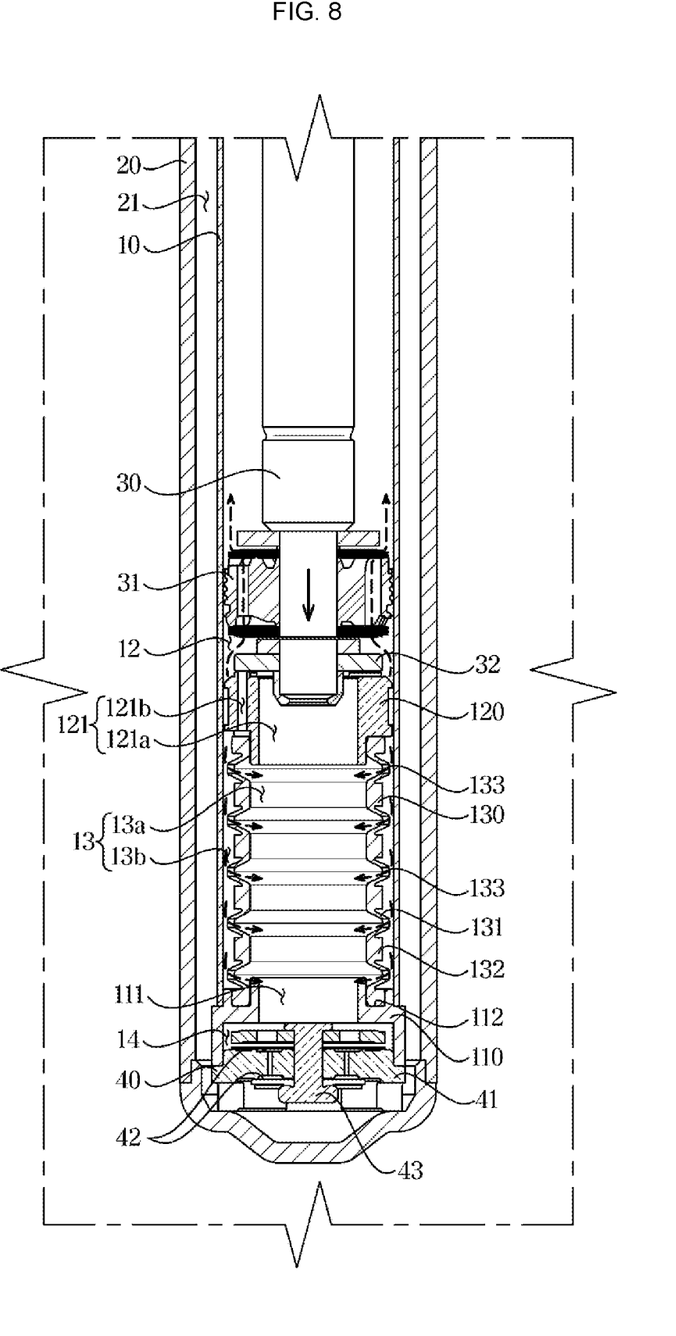
FIG. 8 illustrates an operation of the shock absorber during the compression stroke according to an embodiment of the disclosure.

FIGS. 6 to 8 are operation diagrams sequentially illustrating the operation of the valve assembly 100 of the shock absorber 1 during the compression stroke according to an embodiment of the disclosure.

Referring to FIGS. 6 to 8, the shock absorber 1 according to an embodiment of the disclosure may generate different damping forces depending on stroke lengths or displacement during the compression stroke.

Referring to FIG. 6, the shock absorber 1 generates a damping force due to the resistance of the fluid while the fluid accommodated in the compression chamber 12 passes through the piston valve 31 and moves to the rebound chamber 11 during the compression stroke. At the same time, a damping force is generated due to the resistance of the fluid while during the compression stroke, a part of the fluid accommodated in the compression chamber 12 passes through the body valve 40 through the valve assembly 100 and moves to the reservoir chamber 21 to be compressed.

At this time, because the connection flow path 121 of the valve assembly 100 is completely opened and the bumper member 130 is in a state in which it is not elastically deformed, almost no additional damping force is applied.

That is, in the shock absorber 1, a damping force only by the piston valve 31 and the body valve 40 acts, and a damping force by the valve assembly 100 hardly acts.

Referring to FIGS. 7 and 8, in the shock absorber 1, as the lower washer 32 is in close contact with the guide member 120 by the stroke of the piston rod 30 during the compression stroke, an additional damping force by the valve assembly 100 acts.

Specifically, when the lower washer 32 presses the guide member 120 by the compression stroke, the bumper member 130 is contracted to generate an elastic repulsive force due to the material properties, thereby acting an additional damping force.

At the same time, when the lower washer 32 is in close contact with the upper protrusion 122 while pressing the guide member 120 by the compression stroke, the inlets of the second connection flow paths 121*b* are closed. Accordingly, when the guide member 120 is descended by the compression stroke, the second pressing chamber 13*b* is in a high pressure state, and the working fluid accommodated in the second pressing chamber 13*b* generates a resistance force while flowing to the first pressing chamber 13*a* through the side holes 133, thereby acting an additional damping force.

Accordingly, the shock absorber 1 according to an embodiment of the disclosure may generate an additional damping force when a stroke occurs to the extent that the lower washer 32 presses the guide member 120 during the compression stroke.

Therefore, the shock absorber 1 according to an embodiment of the disclosure may implement a stronger damping force than a conventional shock absorber by applying an additional damping force depending on the stroke length during the compression stroke.

Further, by applying an additional damping force when the stroke length is longer than or equal to a certain length, the shock absorber 1 according to an embodiment of the disclosure may improve the ride comfort of medium and large vehicles, and may prevent damage to components due to an excessive stroke when driving in a poor road environment.

Further, the shock absorber 1 according to an embodiment of the disclosure may implement an additional damping force with a simple structure of the valve assembly 100 and is excellent in modification, thereby reducing the cost of the product and improving the commercial value.

As is apparent from the above, a shock absorber according to an embodiment of the disclosure can prevent a length and volume thereof from excessively increasing by applying an additional damping force during a compression stroke over a certain stroke.

In addition, the shock absorber according to an embodiment of the disclosure can improve ride comfort and adjustment stability of a vehicle by applying a step-by-step damping force during the compression stroke over the certain stroke.

The embodiments disclosed with reference to the accompanying drawings have been described above. However, it will be understood by those skilled in the art that various changes in form and details may be made therein without departing from the spirit and scope of the disclosure as defined by the appended claims.

What is claimed is:

1. A shock absorber comprising a cylinder filled with a fluid, and a piston valve coupled to an end of a piston rod to partition the inside of the cylinder into a rebound chamber and a compression chamber and to which a lower washer is fastened at a lower end thereof, the shock absorber further comprising:
    a guide member disposed to be spaced apart from the lower end of the piston valve so as to be movable forward and backward within the cylinder and having a connection flow path communicating a pressing chamber formed at a lower side and the compression chamber;
    a bumper member provided to be compressible in the pressing chamber to elastically support the guide member; and
    a support member coupled to an end of the cylinder to support a lower end of the bumper member and having a communication hole communicating with the pressing chamber,
    wherein the bumper member partitions the pressing chamber into a first pressing chamber and a second pressing chamber and has a plurality of side holes communicating the first pressing chamber and the second pressing chamber, and
    the connection flow path comprises a first connection flow path communicating the compression chamber and the first pressing chamber, and a second connection flow path communicating the compression chamber and the second pressing chamber.

2. The shock absorber according to claim 1, wherein
    the guide member comprises a plurality of upper protrusions protruding from an upper surface thereof and arranged to be spaced apart from each other, and a plurality of lower grooves recessed on a lower surface thereof and arranged to be spaced apart from each other, and
    the second connection flow path has inlets at the plurality of upper protrusions and outlets at the plurality of lower grooves.

3. The shock absorber according to claim 1, wherein
    the second connection flow path is opened and closed by ascending and descending of the lower washer.

4. The shock absorber according to claim 1, wherein
    the bumper member has one end coupled to the guide member, and the other end coupled to the support member.

5. The shock absorber according to claim 4, wherein
    the bumper member comprises a bellows portion provided to generate an elastic force due to a restoring force against contraction or expansion, and protrusions protruding from an outer surface of the bellows portion to restrict movement of the bumper member in a width direction.

6. The shock absorber according to claim 1, wherein
    a sealing member provided to seal a gap between an outer circumferential surface of the guide member and an inner circumferential surface of the cylinder is mounted on the outer circumferential surface of the guide member.

7. The shock absorber according to claim 6, wherein
    the guide member is provided with a coupling groove formed to be recessed in a ring shape on the outer circumferential surface thereof so that the sealing member is inserted therein.

8. The shock absorber according to claim 1, further comprising
    an outer tube disposed to be spaced apart from the outside of the cylinder to form a reservoir chamber between the cylinder and the outer tube.

9. The shock absorber according to claim 8, further comprising
    a body valve coupled to a lower end of the support member to communicate the connection flow path with the reservoir chamber and generate a damping force.

10. The shock absorber according to claim 9, wherein
    the support member comprises a small-diameter part provided to be press-fitted to an end of the cylinder, and a large-diameter part provided to have a larger radius than the small-diameter part, having a hollow lower chamber at the lower end thereof, and to which the body valve is coupled.

11. The shock absorber according to claim 1, wherein
    the first connection flow path is provided in a form of a hole to vertically penetrate a central portion of the guide member.

12. The shock absorber according to claim 11, wherein
    the second connection flow path is provided in a form of a plurality of holes penetrating vertically to be radially disposed outside the first connection flow path.

13. The shock absorber according to claim 1, wherein
    the shock absorber varies a damping force depending on active cross-sectional areas of the first connection flow path and the second connection flow path.

14. The shock absorber according to claim 1, wherein
    the lower washer extends in a radial direction.

15. A shock absorber comprising a cylinder filled with a fluid, and a piston valve coupled to an end of a piston rod to partition the inside of the cylinder into a rebound chamber and a compression chamber and to which a lower washer is fastened at a lower end thereof, the shock absorber further comprising:
    a guide member disposed to be spaced apart from the lower end of the piston valve so as to be movable forward and backward within the cylinder and having a connection flow path communicating a pressing chamber formed at a lower side and the compression chamber;

a bumper member provided to be compressible in the pressing chamber to elastically support the guide member; and a support member coupled to an end of the cylinder to support a lower end of the bumper member and having a communication hole communicating with the pressing chamber, wherein the bumper member partitions the pressing chamber into a first pressing chamber and a second pressing chamber and has a plurality of side holes communicating the first pressing chamber and the second pressing chamber, and the guide member comprises a plurality of upper protrusions protruding from an upper surface thereof and arranged to be spaced apart from each other.

16. The shock absorber according to claim 15, wherein the guide member comprises a plurality of lower grooves recessed on a lower surface thereof and arranged to be spaced apart from each other.

17. The shock absorber according to claim 15, wherein the plurality of upper protrusions are arranged at regular intervals.

18. A shock absorber comprising a cylinder filled with a fluid, and a piston valve coupled to an end of a piston rod to partition the inside of the cylinder into a rebound chamber and a compression chamber and to which a lower washer is fastened at a lower end thereof, the shock absorber further comprising:

a guide member disposed to be spaced apart from the lower end of the piston valve so as to be movable forward and backward within the cylinder and having a connection flow path communicating a pressing chamber formed at a lower side and the compression chamber;

a bumper member provided to be compressible in the pressing chamber to elastically support the guide member; and a support member coupled to an end of the cylinder to support a lower end of the bumper member and having a communication hole communicating with the pressing chamber, wherein the bumper member partitions the pressing chamber into a first pressing chamber and a second pressing chamber and has a plurality of side holes communicating the first pressing chamber and the second pressing chamber, and the guide member comprises a mounting part protruding from a lower end thereof to be coupled with one end of the bumper member.

19. The shock absorber according to claim 18, wherein an outer diameter of the mounting part is provided to have a size corresponding to an inner diameter of an upper end of the bumper member.

* * * * *